June 6, 1939.　　　D. K. ALLISON　　　2,161,735
COLOR PHOTOGRAPHY
Filed April 15, 1935
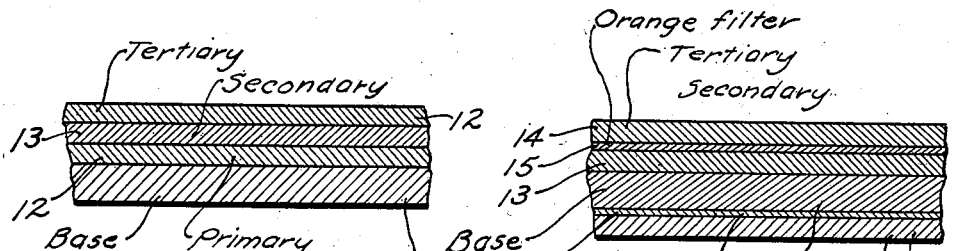
Fig. 1.　　　Fig. 2.
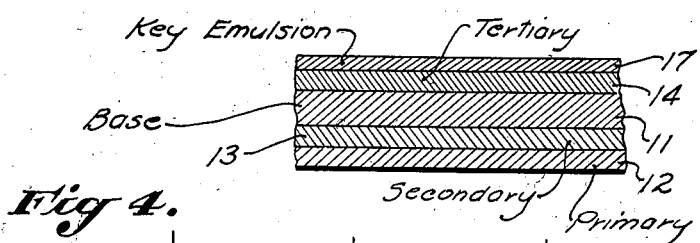
Fig. 3.
Fig. 4.
Fig. 5.
Fig. 6.
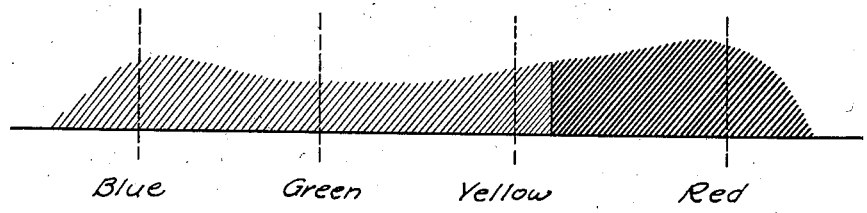
Blue　　　Green　　　Yellow　　　Red
INVENTOR:
Donald K. Allison,
By Robert W. Fulwider
ATTORNEY.

Patented June 6, 1939

2,161,735

UNITED STATES PATENT OFFICE 2,161,735

COLOR PHOTOGRAPHY

Donald K. Allison, Beverly Hills, Calif., assignor to Detracolor, Ltd., a corporation of Nevada Application April 15, 1935, Serial No. 16,377

3 Claims. (Cl. 95—2)

My invention relates in general to the art of color photography and more particularly to sensitized films adapted for use in that art and to a method and means for utilizing such films in the accomplishment of true color rendition. While my invention can be utilized in both still and motion picture photography, it finds its chief application in the production of motion pictures, for while many types of film and processes have been devised for the coloring of still pictures, the inherent difficulties encountered in applying these various methods to the highly specialized industry of motion picture production with its enormous quantities of film to be handled have, so far as I am aware, not heretofore been successfully overcome. Because my system of color photography is, as I have mentioned, particularly applicable to the production of motion pictures, I will confine my description herein to that application of said invention, although it is to be understood that I do not intend to thereby restrict the scope of my invention and whenever I use the term "film", it is to be taken as including plates and all other types of photographic media.

It is an object of my invention to provide a photographic film with latent coloring media therein of such a nature that substantially true color images may be obtained in latent values by exposing the film in the manner now customarily employed in the production of black and white pictures.

It is also an object of this invention to provide a photographic film which after exposure may be treated in a manner as simple as that used for the treatment of black and white film now on the market, and which after such treatment will correctly reproduce all of the colors of the object photographed.

It is a further object of my invention to provide a photographic film adapted for natural color rendition which will compare favorably in cost of manufacture with the commercial films now on the market for black and white work and to provide a method of processing such film which, because of its simplicity, will be much more economical than any process heretofore advanced for the production of colored pictures.

A disadvantage common to practically all of the systems heretofore advanced for producing photographs in color has been the need of having a very different type of film for the photographic negative and for positive prints made therefrom. It will be evident from the following description of my invention that I have overcome this difficulty and am able to use the same type of film and method of treating it for obtaining the negative and the positive prints. However, it is possible to use a somewhat slower emulsion for the positive if desired and preferably one with a finer grain than the usual emulsion for negative work, as for instance a silver chloride emulsion for the positive and a silver bromide emulsion for the negative.

Another object of my invention is to eliminate the necessity of using special cameras, magazines, filters, printers and other specialized equipment heretofore required for the production of motion pictures in color and to thereby materially reduce the cost, uncertainty and time required in obtaining photographic reproductions in natural colors.

Color processes have become known in the trade as a two-color process or a three-color process depending on the number of color separation images produced, although this terminology is not strictly correct if applied to the number of colors reproduced. In the patent of L. M. Dieterich and myself, Number 2,034,230 issued March 17, 1936, a film and process are disclosed which, while giving substantially correct reproduction of all colors, is nevertheless denominated a two-color process by the trade. The invention disclosed herein is a modification and improvement over that covered by said patent in that the present invention may be termed a three-color film and process as distinguished from what is usually designated as a two-color process. While the invention described in said patent produces substantially three-color results by the use of but two emulsions and coloring media and has the advantage of simplicity and ease of construction, the film and process herein disclosed has the advantage of giving more perfect color separation and reproduction than is possible by the use of but two images. This added perfection of color rendition is made possible by the use of three emulsion layers of different sensitivity ranges and the employment of three different latent dyes or leuco bases, as will be set forth in detail hereinafter.

It is a still further object of my invention to provide a method of securing photographic reproductions in color which is entirely free from definition and exposure troubles in exposing the negative or negatives and from registration troubles in printing the positives and which, therefore, insures a photograph in correctly balanced colors without fringe, which is clear and distinct in every detail. Furthermore, by superpositioning a plurality of emulsion layers of different spectrum characteristics, halation is greatly reduced.

These and other objects and advantages not specifically enumerated herein are attained by the types of film and means of film treatment illustrated in the accompanying drawing and hereinafter more fully described.

In the drawing:

Fig. 1 represents an enlarged cross-section of a preferred type of film having three emulsion layers on one side of the base.

Fig. 2 shows an alternative type of film having two emulsion layers on one side of the base and one on the other.

Fig. 3 shows a third type of film having two emulsion layers on each side of the base.

Fig. 4 is a spectrogram of the tertiary emulsion.

Fig. 5 is a spectrogram of the secondary emulsion.

Fig. 6 is a spectrogram of the primary emulsion.

Referring now to Fig. 1 which depicts a preferred type of film construction for the practice of my invention, the numeral 11 designates a base of Celluloid, glass or other suitable substantially transparent or highly translucent substance. Upon this base 11 is coacted a light sensitive emulsion layer 12 which may be similar to the usual type of panchromatic emulsion now quite generally used in the production of ordinary black and white pictures. As will be noted by reference to Fig. 6, the sensitivity range of this emulsion is very wide, including practically all of the visible spectrum, but being particularly responsive to the red end thereof. A second light sensitive emulsion layer 13 is formed in superposed relationship on the layer 12, which emulsion 13 may be termed a super-orthochromatic or semi-panchromatic emulsion in that its sensitivity range includes blue, green and yellow, but no reds as seen by Fig. 5. A third or outer light sensitive emulsion 14 is coated upon the emulsion 13 and has a sensitivity range substantially the same as the type of film now available on the open market by the name of orthochromatic. As will be seen by reference to Fig. 4, this emulsion is predominantly sensitive to the blue end of the spectrum, although a definite response to the greens is also present.

For purposes of brevity, I will hereinafter in the specification and claims refer to the emulsion 12 as the primary emulsion, the emulsion 13 as the secondary emulsion, and the emulsion 14 as the tertiary emulsion, although it is to be understood that by using these terms I do not mean to imply that said emulsions so referred to are necessarily identical with any particular kind or type of film now or hereafter to be used in the industry. The words primary, secondary and tertiary are to be defined and interpreted by the description and illustration thereof herein contained, and are not to be otherwise limited or construed.

In constructing the film according to my invention, the various controlling factors such as choice of chromatizing materials, thickness and speed of emulsion, choice of sensitizing salt and other variables are coordinated and combined so that each emulsion gives substantially the response shown by the heavily shaded portions of the spectrograms in Figs. 4, 5 and 6. That is to say, the tertiary emulsion 14 records the blues and greens, the secondary emulsion 13 records the oranges, yellows and a portion of the greens, and the primary emulsion 12 records the reds, oranges and down into the yellow orange range. It will be noted that while in the form illustrated there is a large overlapping of sensitivity by reason of the secondary including the tertiary range, plus additional wave lengths and the primary including the secondary plus the oranges and reds, there is but a slight overlap in the response of the various emulsions due to penetration of actinic light rays. The overlap between the tertiary 14 and the secondary 13 is necessary of course to secure correct reproduction of the greens by a combination of blue and yellow and the overlap between the secondary 13 and the primary 12 is desirable to lighten up the oranges and orange yellows.

This desired color response can be secured in several ways, as by the use of proper filter dyes to be described in detail hereinafter with reference to a modified form of film for use in my invention, by making the respective emulsion layers sensitive only to the particular color range to be recorded by that emulsion; or by so proportioning the speeds and thicknesses of the respective emulsions that undesirable light is filtered out before it reaches a particular emulsion. I prefer to use this latter method as simpler and cheaper, although it is to be understood that my invention is not limited thereto, but also comprehends a film constructed by the first mentioned methods.

It is well known that a gelatin emulsion containing colloidal silver halide has a definite dispersive action on light rays impinging thereon, and that this dispersion causes an absorption of the rays with a consequent filtering effect. It is likewise known that refrangibility is a function of the color or wave length of the particular light rays and further that the refrangibility of light increases as the wave length decreases. With this principle in mind, it will be readily seen that by properly proportioning the thickness and speed of emulsions 13 and 14, only the required color response will be obtained from each emulsion layer in my film. As the blue rays are the most refrangible, they will soon be dispersed and absorbed in the tertiary emulsion. The green rays being less refrangible some of them, along with the yellow rays will penetrate through to the secondary emulsion and be recorded there, but will become absorbed in that emulsion so as not to reach the primary emulsion 12. However, the red rays will be but little absorbed by the first two emulsion layers and will pass on through them to impinge on the primary emulsion 12 and be recorded thereby. By this simple expedient it will be seen that accurate three-color separation is obtained without the use of filter dyes.

As previously mentioned, my invention contemplates the use of latent dyes or leuco bases which are themselves colorless, but will oxidize to the colored dye form on suitable treatment, and I will now explain how they are employed in the film just described. In forming the film structure the leuco base of a blue dye is incorporated in the tertiary emulsion 14, the leuco base of a yellow dye is incorporated in the secondary emulsion 13, and the leuco base of a red dye is incorporated in the primary emulsion 12. The incorporation of the various leuco bases in their respective emulsion layers can be accomplished by any convenient means, such as mixing with the emulsion before coating, dipping the coated layer in a solution of the leuco base to impregnate the layer, or any other suitable method, none of which form any part of this invention.

I have found that the leuco bases of many basic aniline dyes are suitable for use in my invention and particularly that the leuco bases of dyes of the diphenylmethane, tri-phenylmethane and acridine series of aniline dyes have sufficient stability in both their leuco and dye forms to be adapted for photographic work. The particular dye chosen will of course depend upon particular conditions, such as the type of emulsion used, the brilliancy and color balance sought to be reproduced, the availability of the dye and other variable factors. The following are examples of the many basic dyes, the leuco bases of which are suitable for use in my invention.

*For blue*

(a) 2:5 dichlorotetramethyldiaminotriphenylcarbinol, commonly known as Victoria Green
(b) Tetramethyldiaminotriphenylcarbinol, commonly known as Malachite Green.
(c) O-chlorotetraethyldiamino-triphenyl carbinol, a substance having no common technologic name

*For yellow*

(a) 2:8 diamino 3:7 dimethylacridine commonly known as Acridine Yellow
(b) 2:4 aminophenyl-4-methylquinoline, commonly known as Flavaniline
(c) Imino tetramethyldiparaminodiphenylmethane hydrochloride, commonly known as Auramine

*For red*

(a) Tetraethyl - meta - diaminophenolphthalein, usually known as Rhodamine
(b) Triaminodiphenyltolylcarbinol, usually known as Fuchsine
(c) Tetramethyldiaminophenylacridine, usually known as Acridine Orange A film constructed in accordance with my invention is exposed in a suitable camera with the tertiary emulsion 14 facing the lens. Light rays from the object being photographed then impinge first on this outer emulsion and thence pass on to the inner emulsions in varying degrees as previously described. The exposed film carrying three latent images thereon, blue and green in the tertiary, green, yellow and orange in the secondary and orange and red in the primary is then developed in a suitable developing solution and washed. After development, the images are composed of free metallic silver and shade from light greys to black, depending upon the intensity of the light which impinged on the respective emulsions, the respective leuco bases being unaffected by the exposure or development. The developed film is then immersed for several minutes in a solution such as bromine water, chlorine water, potassium ferricyanide, potassium bichromate, potassium permanganate or other solution which will oxidize the free silver to a suitable silver salt. As this oxidation proceeds, the respective leuco bases are oxidized to their dye form having color and are selectively mordanted in situ by the silver salt as formed.

The film is then subjected to a thorough water wash to remove the unmordanted dye from the unexposed portions of the emulsions and is immersed in a fixing solution such as sodium thiosulphate containing a small amount of tannic acid or formaldehyde. The action of the fixing solution is to remove the translucent silver salt and remordant the dye in situ to give a transparent image having the desired colors. When the film becomes sufficiently transparent, it is given another water wash and dried, the finished product being a negative portraying each object photographed in its proper color but having the densities reversed, that is to say, dark colored objects are shown as light colored in the negative and the light colored objects are shown as dark colored, which condition follows naturally from the fact that the density of the negative images is directly proportional to the amount of light falling on the film which in turn is inversely proportional to the shade of the object photographed.

To obtain a positive print of the original object photographed the finished colored negative is printed, preferably by contact printing, to the tertiary face of a sensitized film which is similar, but need not be identical in all respects to the film used to secure the negative and which we will, for descriptive purposes, designate as the positive raw stock. It will be evident that the positive raw stock is thus exposed to the same colors and receives light rays from the same parts of the spectrum as the negative received on being exposed to the light reflected from the original object photographed, except that where the negative received white light, the positive will receive no light, and where the negative received no light, the positive will be exposed to white light. The shades of the various colors will also be reversed, the light blue, for instance, on the negative will pass a relatively large amount of light, causing a heavy exposure on the positive and the dark blue on the negative will pass a relatively small amount of light with a consequent slight exposure of the positive giving on final treatment, for example, a light blue which corresponds with the light blue of the object photographed.

After the positive stock is exposed in printing, it is developed and treated as was the exposed negative, giving a resultant photograph in substantially natural colors.

The blue colors of the original object photographed are given by the blue dye image in the tertiary emulsion. The greens are formed by the combination of blue dye in the tertiary and the yellow dye in the secondary, while yellows are produced by the yellow dye in the secondary alone. The red dye in the primary emulsion cooperates with the yellow dye in the secondary to give the yellow oranges and oranges, the reds being reproduced by the red dye in the primary emulsion alone. With these fundamental colors properly recorded and reproduced as previously explained, all of the various intermediate shades and variations thereof can also be produced, giving a final positive photograph wherein all of the colors of the original object photographed are correctly and accurately reproduced and can be satisfactorily projected on a screen.

Referring now to Fig. 2, a modified form of film for use in my invention is shown, wherein the secondary emulsion 13 and the tertiary emulsion 14 are superposed on one side of the base 11 and the primary emulsion 12 is coated on the opposite side of the base 11. If the proper material is used for the base 11, it will be found that practically no loss of light is experienced by reason of passing through the base. In illustrating this form of film I have shown an orange filter dye 15 which passes red and yellow and a small amount of green, as interposed between emulsions 13 and 14. This filter dye may be coated on emulsion 13 before emulsion 14 is laid down, can be incorporated throughout the emulsion 14 itself, or can be carried by a thin stratum interposed between the two emulsions. Coated on the base 11, incorporated in the emulsion 13 or otherwise conveniently positioned in front of emulsion 12 is a red filter dye 16 which passes orange and red but predominantly the latter. There are many removable filter dyes generally known to the art which are suitable for such use, as for instance tartrazine for the green-yellow-red filter, and Congo red for the red filter. By a film construction as just described it will be obvious that no particular attention need be paid to the respective speeds and dispersive characteristics of the several emulsion layers other than the usual coordination to secure proper photographic reproduction and to insure adequate light reaching the primary emulsion as the filters will provide the respective emulsions with light rays of the proper wave lengths in accordance with the discussion of my preferred form previously described. The treatment of this modified form of film is in every respect similar to that heretofore given in detail except that the filter dye must be washed out during treatment by some suitable solvent if a water soluble dye is not used.

In Fig. 3 still another modified form of film suitable for use in my invention is shown wherein the secondary 13 and the primary 12 are coated on one side of the base 11 and the tertiary 14 is coated on the other side. Superposed on the tertiary 14 is a very slow emulsion 17 in which no leuco base is incorporated and which we will term the key emulsion in that its function is primarily to improve outline and color definition by giving more body to the images and particularly in strengthening or emphasizing the grays and blacks which are formed of a combination of all the colors in the film. It will be apparent that various combinations of the three films illustrated are possible and that all of them may be formed with or without filter dyes.

If it is desired to produce a sound motion picture by the sound on film method, my film is made with the customary sound track along one side thereof. If it is desired to record the sound on the picture negative as is often the case in news-reel work, this can be accomplished in like manner as it is now accomplished for black and white photography. However, the sound is usually recorded on a separate negative and developed separately. In either case the negative sound track is printed to the positive picture film and in my invention may be either black and white or colored. If a black and white sound track is desired the negative track is printed to the positive and is recorded in all of the emulsions, and also in the key emulsion if the type of film illustrated in Fig. 3 is used. When the colors are brought out in the finished positive there will be blue, yellow and red superposed sound tracks on the film, the combination of the three giving a black and white finished sound track.

If, for any reason a colored finished sound track is desired, this can be accomplished by modifying the film or the printing thereof, as by inserting a color filter, preferably blue, in the sound track printer aperture so that the sound track is printed in only one emulsion, the tertiary when a blue filter is used. When the final coloring is obtained, the sound track being in one emulsion only will, of course, bear only one color.

While I have described a preferred form of my invention as applied to motion picture films, it is to be understood that it is also equally applicable to still photography. In this case a film preferably as shown in Fig. 1 is used for the positive, the base being of paper or other suitable material which will produce an opaque surface instead of the translucent composition used for motion picture film. It will be found that a film of this nature develops even more readily than the form shown in Fig. 1 for motion picture use, for the reason that the developing solution penetrates through the paper base to act on the inner emulsion from the rear while also going into the outer emulsions from the face of the film.

It will now be seen that I have provided a system of color photography which not only gives a reproduction of all colors photographed, but also one that faithfully reproduces the gradations and shades of each individual color by reason of the fact that among other things I color the negative and positive image in each instance with the same color as that to which it is sensitive, as contradistinguished from the many known processes of coloring the positive images respectively with colors complementary to those to which their respective negatives were sensitive.

While that form of application of my invention hereinbefore illustrated and described is fully capable of performing the objects and providing the advantages primarily stated, there are various other embodiments and modifications of my invention and numerous other leuco bases other than the examples given which are likewise capable of performing these objects and providing these advantages and I therefore wish my invention to be understood as not being restricted to the embodiment hereinbefore described but rather to be determined by the scope of the appended claims.

I claim as my invention:

1. In a photographic film the combination of: a primary emulsion layer effectively sensitive only to the orange-red end of the spectrum which carries the leuco base of a red basic dye; a secondary emulsion layer in superposition with said primary layer which is effectively sensitive only to the green-yellow portion of the spectrum and which carries the leuco base of a yellow basic dye; and a tertiary emulsion layer in superposition with said other layers which is effectively sensitive only to the blue-green end of the spectrum and which carries the leuco base of a blue basic dye.

2. In a photograph film the combination of: a translucent base; an emulsion layer coated thereon which is effectively sensitive only to the orange-red end of the spectrum and carries the leuco base of a red basic dye therein; a second emulsion coated on said first emulsion which is effectively sensitive only to the green-yellow portion of the spectrum and carries the leuco base of a yellow basic dye therein; a third emulsion coated on said second emulsion which is effectively sensitive only to the blue-green end of the spectrum and carries the leuco base of a blue basic dye therein.

3. In a photographic film the combination of: a primary emulsion layer effectively sensitive only to the red end of the spectrum and carrying the leuco base of a red basic dye; a secondary emulsion layer effectively sensitive only to the green-yellow range of the spectrum and carrying the leuco base of a yellow basic dye; and a tertiary emulsion layer effectively sensitive only to the blue-green end of the spectrum and carrying the leuco base of a blue basic dye therein.

DONALD K. ALLISON.